April 27, 1965  H. HANKE  3,180,407
STEEL PIPE RECUPERATOR
Filed Sept. 5, 1961  3 Sheets-Sheet 2

INVENTOR.
Heinrich Hanke
BY

United States Patent Office 3,180,407
Patented Apr. 27, 1965

3,180,407
STEEL PIPE RECUPERATOR
Heinrich Hanke, Krefeld-Uerdingen, Germany, assignor to Industrie-Companie Kleinewefers Konstruktions- u. Handelsgesellschaft m.b.H., Krefeld, Germany
Filed Sept. 5, 1961, Ser. No. 136,411
Claims priority, application Germany, Sept. 7, 1960, J 18,671
4 Claims. (Cl. 165—145)

The present invention relates to a steel pipe recuperator assembly associated with a heating gas passage.

In connection with cylindrical recuperators which receive heat from gases of high temperature, it is known to provide the walls of the chambers, passages or the like with pipes in order to cool the walls or heat up the medium in said pipes.

With recuperator assemblies of the above type it is customary in order to allow for expansion of the tubes or pipes to suspend the same at the ceiling. It is also customary to provide for the tubes to be directly engaged by the hot gases.

It is an object of this invention to provide a recuperator assembly of the above mentioned type, which will make the suspension on the ceiling superfluous, and wherein heat can be extracted from extremely hot gases without the high temperatures deleteriously effecting the tubes or collecting boxes of the recuperator.

It is a further object of this invention to provide a recuperator assembly as set forth in the preceding paragraph, which will make it possible easily and quickly to install a recuperator in and to remove the same from the heating passage, and wherein the hot gases do not impinge directly on the recuperator tubes or collection boxes.

These and other objects and advantages of the invention will appear more clearly from the following specification in connection with the accompanying drawings, in which.

Figure 3:
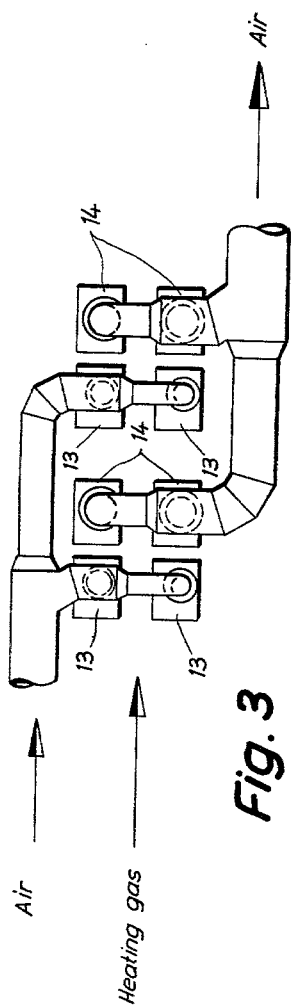

FIG. 3 diagrammatically illustrates the course of the heating gas and of the combustion air.

Figure 1:
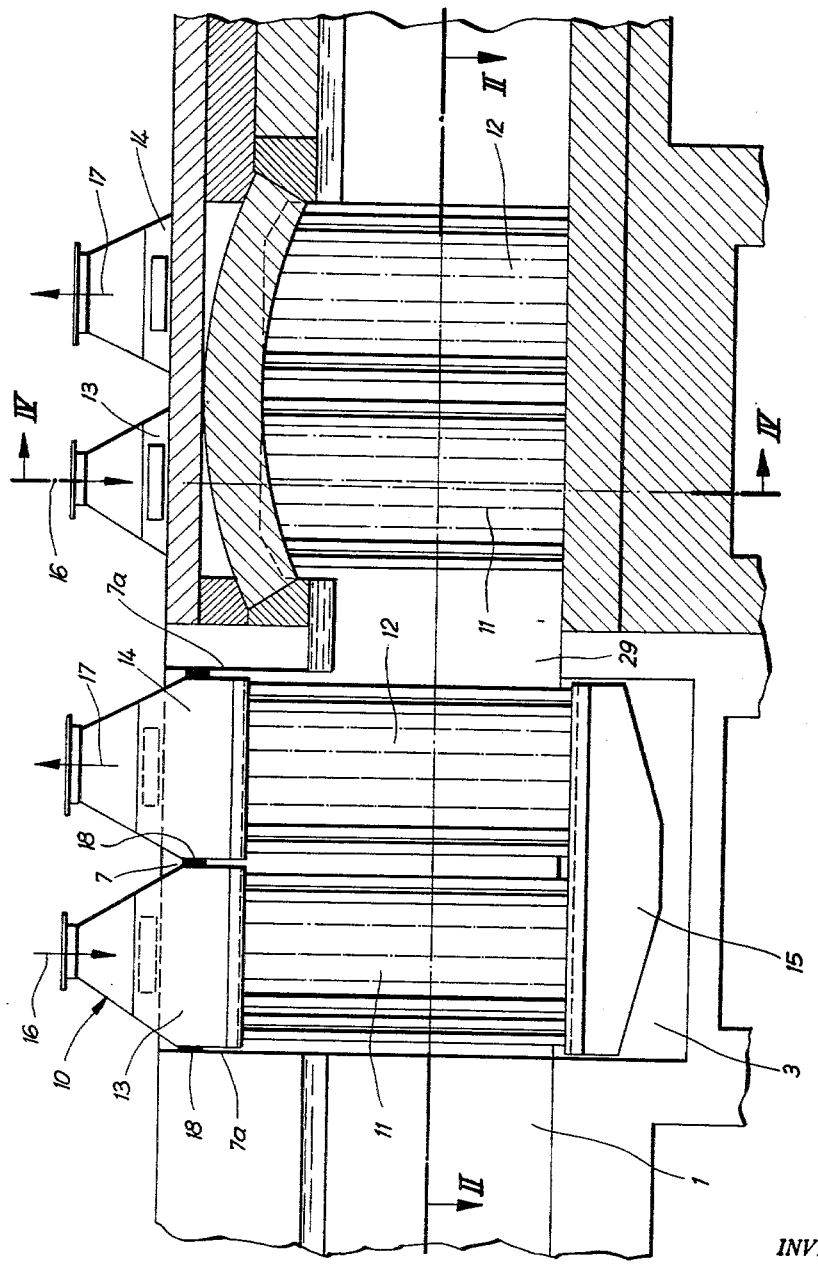
FIG. 1 illustrates a longitudinal section through a heating passage of a recuperator assembly according to the present invention, said section being taken along the line I—I of FIG. 2.
Figure 2:
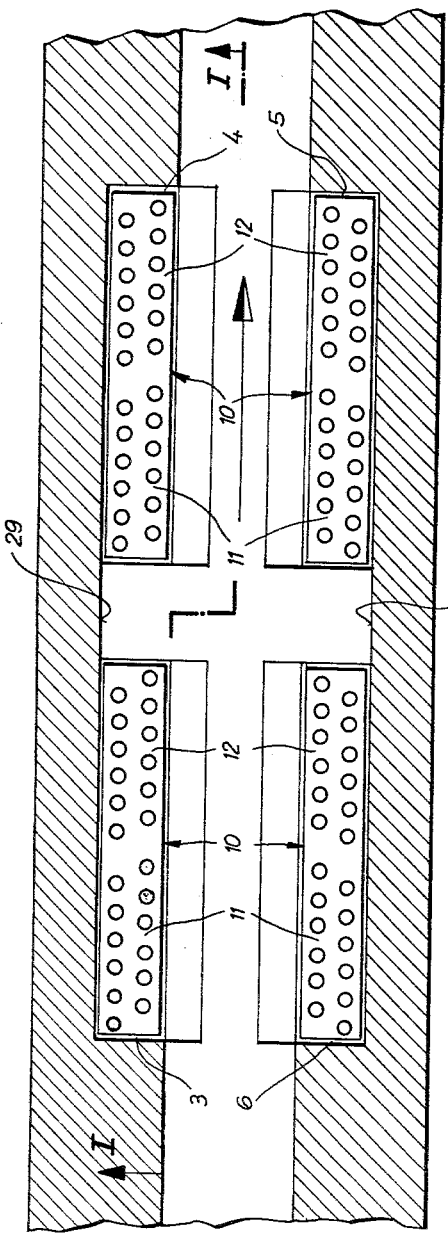
FIG. 2 represents a section taken along the line II—II of FIG. 1.
Figure 4:
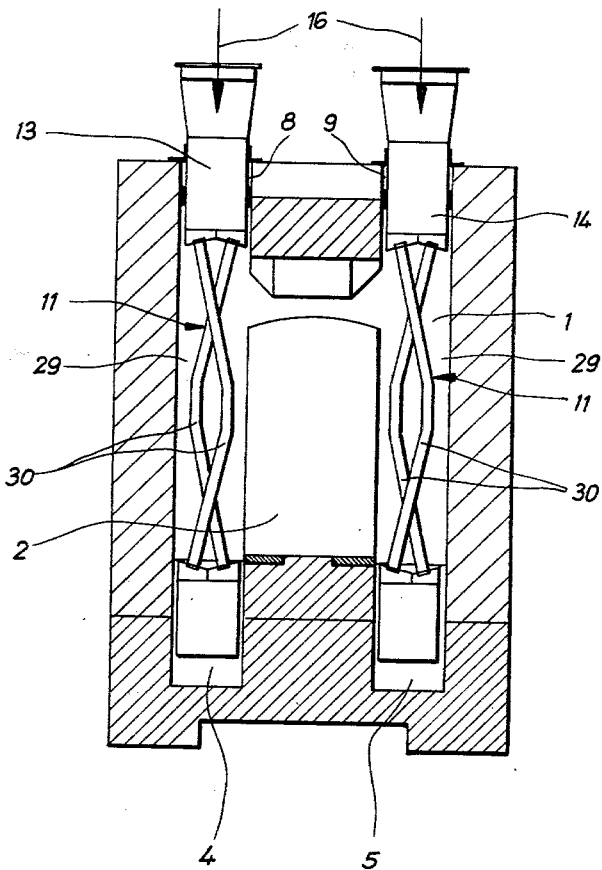

FIG. 4 represents a section taken along the line IV—IV of FIG. 1.

The above mentioned objects have been realized according to the present invention by passing the medium to be heated, for instance combustion air, through two parallel groups of tubes of the recuperator in counter current flow and from one group of tubes to the other through transfer chambers interconnecting the same, while means are provided which will assure a tight seal between the distributor and collecting chambers and the opening through which the recuperator is inserted into the heating passage.

According to a further feature of the invention, the transfer chambers and the distributor and collecting chambers of the recuperator are arranged outside said heating gas passage proper. Therefore, they are not directly exposed to the flow of the hot heating gases but, rather, extract heat therefrom mainly by radiation. In particular, the collection boxes are remote from the hot gases.

According to a preferred embodiment of the invention, the length of the nest of tubes is greater than the height of the heating passage, the transfer chamber being located in a recess of the wall of the heating passage, for instance near the bottom thereof. At the bottom of the heating passage the recuperator does not possess any structural elements extending from one passage wall to the other.

Referring now to the drawings in detail, the arrangement shown therein comprises a heating gas passage 1 which in a manner known per se has a rectangular cross section and leads at one end into a servicing opening 2 (FIG. 4). In conformity with the present invention, the side walls of the heating passage are provided with recesses or lateral extensions 29. The bottom of the heating passage at the level of said recesses is also provided with recesses 3, 4, 5 and 6. Above said recesses 3, 4, 5 and 6 the ceiling or top of the heating passage is provided with openings 7, 8 and 9.

The recuperator 10 to be employed consists primarily of the two nests of tubes 11 and 12. The upper portion of the nest of tubes 11 carries the distributor or inlet chamber 13, whereas the upper portion of the nest of tubes 12 is provided with the collecting chamber 14. Both nests of tubes have their lower ends interconnected by a transfer chamber 15 so that the medium to be heated up will enter the recuperator in the direction of the arrow 16, pass through the transfer chamber 15 and then through the nest of tubes 12. The heated up medium will leave the recuperator in the direction of the arrow 17.

The embodiment illustrated in the drawing has four recuperators inserted into the recesses at the side of the heating passage, said recuperators being arranged in pairs located opposite to each other. The recess 29 extends from one end face of one recuperator to the other end face of the second recuperator when looking in longitudinal direction of the heating passage.

The length of the nest of tubes 11, 12 or the height of the recuperator 10 is so dimensioned that the chamber 15 extends into one of the recesses 3, 4, 5 and 6, whereas the inlet chamber 13 and the collecting chamber 14 extend into one of the openings 7, 8, 9. Between the two chambers 13, 14 on one hand and also between said chambers 13 and 14 and the walls of the opening through which said chambers are inserted there are provided seals 18 in cooperation with which the said chambers will seal the heating passage 1 in upward direction. While the seals 18 may be of any suitable material, seals of asbestos have proved particularly advantageous in this connection.

As will be evident particularly from FIG. 4, said individual tubes 30 of the nest of tubes 11, 12 are acted upon principally by radiation from the heating gases passing in a direction perpendicular to the plane of the drawing of FIG. 4. The heating gases do not pass in direct contact over the nest of tubes or around the transfer chambers 15 and the chambers 13 and 14 in the openings 7, 8 and 9.

The recesses 3, 4, 5 and 6 and the openings 7, 8 and 9 are selected as to size so that only a slight gap will remain between the walls of the corresponding chambers and the walls of the recesses and openings.

In addition to the seals 18, further seals may be provided in the said gaps in order to assure that the heating gases will pass exclusively through the cross section of passage 1 and of the recesses 29 while preventing heating gases from reaching the chambers. If desired, the arrangement may also be such that only such a quantity of heating gas will reach the transfer chambers 15 that the flow of the heating gases will not or only slightly be affected thereby.

It is, of course, to be understood that the present invention is, by no means, limited to the particular construction shown in the drawings but also comprises any modifications within the scope of the appended claims.

What I claim is:
1. In combination; substantially horizontally extending and rigidly interconnected side, top, and bottom walls defining a longitudinally extending passage for hot flue gases with the bottom of said top wall forming the ceiling of the passage and the top of the bottom wall forming the floor thereof, and recuperator tubes arranged in laterally adjacent relation to said passage to receive heat by radiation from hot gases flowing in said passage, said side walls having vertically extending recesses therein of substantially uniform cross section for receiving recuperator units including said tubes, said recesses being disposed laterally of said passage and having open sides extending from the floor of said passage to the ceiling thereof and communicating directly with said passage, each recess having at least one first portion at the lower end in the respective side wall extending therein to beneath the floor of said passage and also having at least one second portion at the upper end in the respective side wall vertically above said first portion and extending through the top of the side wall in a region disposed laterally of the ceiling of the passage, at least one recuperator unit in each recess comprising tubes extending generally vertically in the respective recess and disposed entirely within the respective recess and laterally of said passage while being exposed to radiation from hot gases in the passage via the open side of the respective recess, a transfer chamber in a pertaining first portion of the respective recess connected to the lower ends of the tubes of the unit, and inlet and collecting chambers in a pertaining second portion of the respective recess and connected to the upper ends of the tubes of the unit, each recuperator unit being insertable into and removable from its respective recess via the open upper end of the pertaining said second portion of the recess without disturbing the said top wall.

2. The combination according to claim 1 in which each recuperator unit comprises a first group of downgoing tubes leading from the said inlet chamber to the said transfer chamber and a second group of upgoing tubes leading from the said transfer chamber to the said collecting chamber, and sealing means sealing said inlet and collecting chambers to the periphery of the said second portion of the respective recess above the ceiling of said passage.

3. The combination according to claim 2 in which each said tube has a length greater than the distance from the floor of the passage to the ceiling thereof, and said transfer chamber is disposed in said first portion of the respective recess entirely beneath the floor of the said passage and said inlet and collecting chambers are disposed in said second portion of the respective recess entirely above the ceiling of said passage.

4. The combination according to claim 3 in which each said recess comprises longitudinally spaced ones of said first and second portions, and a recuperator unit in each recess for each set of vertically aligned first and second portions thereof.

References Cited by the Examiner

UNITED STATES PATENTS

| 1,466,383 | 8/23 | Rees et al. | 165—101 |
| 2,349,439 | 5/44 | Koppers | 263—20 |
| 2,742,895 | 4/56 | Naucler et al. | 126—109 |

FOREIGN PATENTS

| 590,681 | 1/34 | Germany. | |

CHARLES SUKALO, *Primary Examiner.*

HERBERT L. MARTIN, PERCY L. PATRICK,
*Examiners.*